P. KÜHN.
REGENERATOR FOR SMELTING FURNACES.
APPLICATION FILED JUNE 12, 1920.

1,421,259. Patented June 27, 1922.

Inventor:
Paul Kühn

UNITED STATES PATENT OFFICE.

PAUL KÜHN, OF DORTMUND, GERMANY.

REGENERATOR FOR SMELTING FURNACES.

1,421,259.  Specification of Letters Patent.  Patented June 27, 1922.

Application filed June 12, 1920. Serial No. 388,681.

*To all whom it may concern:*

Be it known that I, PAUL KÜHN, a citizen of the German Empire, residing at Dortmund, Germany, have invented certain new and useful Improvements in Regenerators for Smelting Furnaces (for which I have filed applications in Germany, filed May 4, 1918, and December 6, 1918; Luxemburg, filed August 18, 1920; Italy, filed March 20, 1920; France, filed April 3, 1920; Belgium, filed March 24, 1920; Great Britain, filed January 20, 1920; Czecho-Slovakia, filed June 14, 1920), of which the following is a specification.

My invention relates to regenerators for smelting furnaces and the like and its object is to provide a form of heat accumulator which renders it practicable to employ coal dust as a fuel.

These regenerators are of course also suitable for the heating of generator and cold gases. Not only are slag and dust separated in these regenerators but the preheating of heating agents such as air is rendered more intense on account of the longer distances they are made to pass through.

In the attempts that have hitherto been made to use coal dust in regenerator furnaces the drawback was encountered that the checker work became clogged up. The slag that settled in the checker work, clogged it up more and more in the course of time, opposed in an increasing measure the giving off of heat and thus reduced the efficiency, and soon led to a complete break-down. This evil is removed in accordance with the present invention by altering the shape of the chamber of the heater with the checker work disposed therein, the rectangular cross-section hitherto employed being replaced by an angular one in such a manner that the heated gases coming from the hearth are first caused to pass through a horizontal section whose floor slopes downward to the rear. A second section is connected directly to the first one within the checker work, the second section extending downward in a vertical or oblique direction. The second section may as well extend on a uniform level but is always arranged to form an angle with the first one. By thus subdividing the exhaust gas passage within the checker work into a horizontal section and a section extending at an angle thereto the slag is caused to settle in the first section the heat accumulated thereby keeping the slag in a liquid state so that it continually flows off along the floor sloping downwards to the rear. A clogging up of the checker work by the slag can no longer take place. The particles of dust and ashes that might be carried past the first arm by the hot gases are deposited in the second section of the gas passage within the checker work and can be readily removed therefrom in the form of dust or in a similarly disintegrated state.

In the drawings affixed to this specification and forming part thereof two modifications of a furnace involving my invention are illustrated in a diagrammatic manner. In the drawings—

Figure 1:
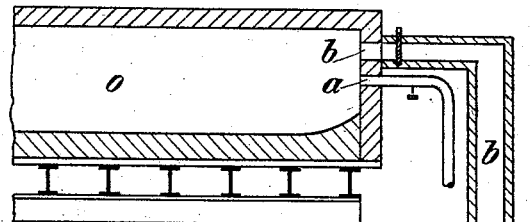
Fig. 1 is a vertical longitudinal section of an open-hearth furnace which may be used either as a stationary or a tilting furnace.
Figure 2:
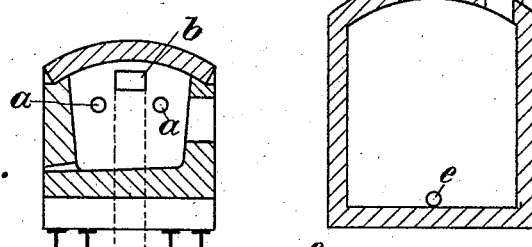
Fig. 2 is a cross section.

The coal dust, mixed with gases or the like, is introduced into the combustion chamber through the blow-holes $a$, whilst the intensely heated air by which the combustion of the coal dust is brought about enters through the flue $b$. At both ends of the furnace $o$ regenerating chambers $d$ filled with checker work are provided. In accordance with the invention the checker work is arranged in two sections $c$ and $i$ disposed at an angle (Fig. 2). The hot gases flowing from the combustion chamber through the channel $b$ into the regenerating chamber $d$ have to pass first through the section $c$ of the checker work. At the end of this section their direction is changed as they enter the second section $i$. The sole or bottom $s$ of the section $c$ slopes downwards to the rear in order to cause the slag that settles in liquid condition in this first section to continually flow off to the rear.

The slag is discharged through the opening $e$ above the sole of the chamber at the entrance end of the heater. Any particles of dust and ashes which may have been carried beyond the section $c$ settle in the second section $i$ of the checker work and can thence be removed in loose condition through the cleaning holes $f$.

The section $i$ need not necessarily slope downwards from section $c$. It may also extend horizontally or nearly so, but in order to obtain the accumulation of heat necessary for producing an intense heat in section $c$ a change of direction of the gas passage is desirable. Hence it will sometimes suffice if the section *i* merely extends at an angle relatively to the section *c*.

Figure 3:
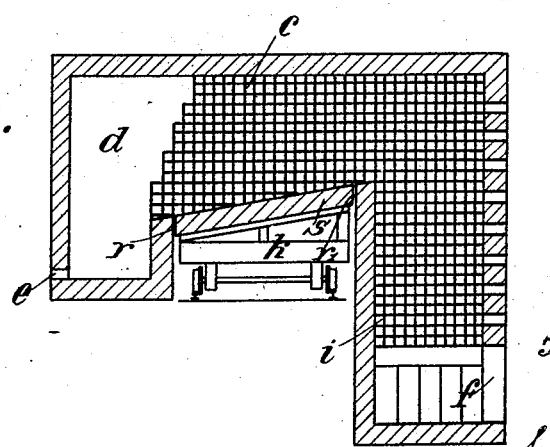
Fig. 3 is a similar view of a modification.

Practical experience has shown that if the arrangement described above is employed, the scorification of the particles of ash contained in the combustion gases which takes place in section *c* of the regenerator is followed by a more rapid wear of the checker work filling this section than the one filling section *i*. I therefore prefer providing means for facilitating the replacing of the checker work in section *c*. To this end, as shown in Fig. 3 of the drawings, the sole *s* of this section is laid out on a steel truck *k* and the connection between chambers *d* and *i* is then established with great care. On the movable sole *s* the checker work for section *c* is then erected separately. Whenever the necessity arises of replacing the checker work, the joints *r* and *r'* are uncovered, the truck *k* carrying the checker work is withdrawn, the checker work is removed and the truck is shoved back into the chamber in order to erect the fresh checker work. One may however also effect this outside the chamber and shove the truck in place afterwards.

It will be understood that many modifications or changes may be made without departing from the spirit and scope of the invention.

I claim:

1. In a furnace in combination, a regenerating chamber and checker work partly filling it, the said chamber being subdivided in two sections, one extending substantially in horizontal direction and another one extending downwards at an angle to the former one.

2. In a furnace in combination, a regenerating chamber and checker work partly filling it, the said chamber being subdivided in two sections arranged at an angle relatively to each other, the sole of the section adjoining the fire place sloping downwards to the rear.

3. In a furnace in combination, a regenerating chamber and checker work partly filling it, the said chamber being subdivided in two sections arranged at an angle relatively to each other, and a truck movable underneath and adapted to carry the movable sole of the first section.

In testimony whereof I affix my signature.

PAUL KÜHN.